(12) United States Patent
Martens et al.

(10) Patent No.: US 7,294,661 B2
(45) Date of Patent: Nov. 13, 2007

(54) FLAME RESISTANT AROMATIC POLYAMIDE RESIN COMPOSITION AND ARTICLES THEREFROM

(75) Inventors: Marvin M. Martens, Vienna, WV (US); Yuji Saga, Tochigi (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 395 days.

(21) Appl. No.: 10/953,681

(22) Filed: Sep. 29, 2004

(65) Prior Publication Data

US 2005/0119379 A1 Jun. 2, 2005

Related U.S. Application Data

(60) Provisional application No. 60/508,506, filed on Oct. 3, 2003.

(51) Int. Cl.
*C08K 5/5313* (2006.01)
*C08K 3/22* (2006.01)
(52) U.S. Cl. .................. 524/126; 524/133; 524/437
(58) Field of Classification Search .................. 24/126; 524/133, 126, 437
See application file for complete search history.

(56) References Cited

U.S. PATENT DOCUMENTS

| 5,242,960 | A |   | 9/1993 | Ostlinning |
| 5,256,718 | A | * | 10/1993 | Yamamoto et al. .......... 524/411 |
| 5,306,754 | A | * | 4/1994 | Yamamoto et al. .......... 524/289 |
| 6,255,371 | B1 | * | 7/2001 | Schlosser et al. ............ 524/100 |
| 2001/0007888 | A1 | * | 7/2001 | Asano ......................... 524/115 |
| 2004/0021135 | A1 | * | 2/2004 | Steenbakkers-Menting et al. ........................... 252/609 |
| 2004/0048016 | A1 | * | 3/2004 | Wang et al. ................ 428/35.7 |
| 2006/0089435 | A1 | * | 4/2006 | Hoerold et al. ............. 524/115 |

FOREIGN PATENT DOCUMENTS

| EP | 1 074 585 | 2/2001 |
| WO | WO 96/09344 | 3/1996 |
| WO | WO 02/28953 A1 | 4/2002 |

* cited by examiner

*Primary Examiner*—Peter Szekely

(57) ABSTRACT

The present invention relates to a flame resistant polyamide resin compositions for moulded articles and articles formed therefrom, comprising aromatic polyamide with phosphinate and/or diphosphinate flame retardant and, optionally, glass fibers. Further provided are articles for use in a variety of applications including electrical and electronic parts requiring electrical insulation.

9 Claims, No Drawings

FLAME RESISTANT AROMATIC POLYAMIDE RESIN COMPOSITION AND ARTICLES THEREFROM

CROSS REFERENCE TO RELATED APPLICATIONS

This application claims priority to U.S. Provisional Application No. 60/508,506, filed Oct. 3, 2003.

FIELD OF THE INVENTION

The present invention relates to certain flame resistant aromatic polyamide resin molding compositions employing a non-halogenated flame retardant. More particularly, the present invention relates to such aromatic polyamide resin molding compositions comprising selected phosphinates as flame retardant and inorganic reinforcing agents.

BACKGROUND OF THE INVENTION

Polyamide resins possess excellent mechanical properties, moldability, and chemical resistance and have therefore been used in automotive parts, electric/electronic components, mechanical components, and many other applications. Articles made from polyamide resins possess extremely desirable physical properties. However, in certain applications, it is desirable that polyamide resin compositions be flame retardant and meet the UL-94 standard for a high degree of flame retardance. This requirement has promoted research into a variety of methods for imparting flame retardance to polyamide resins. A common method of imparting flame retardance to thermoplastic resin compositions involves incorporating a halogenated organic compound such as brominated polystyrene as a flame retardant along with an antimony compound that acts as a synergist for the flame retardant. However, the use of halogenated flame retardants has certain drawbacks in that these materials tend to decompose or degrade at the temperatures used to mold polyamide compositions. The degradation products can corrode the barrels of compounding extruders, the surfaces of molding machines, and other equipment halogenated flame retardants come in contact with at elevated temperatures. The degradation products of halogenated flame retardants can also result in molded articles that have poor surface appearance.

The use of non-halogenated flame retardants such as phosphate or phosphinate compounds with triazine derivatives has been proposed in WO 96/09344 but these flame retardants are unstable at high temperatures and can decompose or degrade during molding, leading to detrimental effects on the electrical properties of a compounded polyamide resin composition containing these flame retardants, especially under conditions of high humidity.

Thus, effective non-halogenated flame retardants that have good heat stability and that do not have a detrimental effect upon a resin's properties, in particular electrical properties, are desirable. U.S. Pat. No. 5,773,556 discloses compositions comprising polyamide and phosphinate or diphosphinate. U.S. Pat. No. 6,255,371, however, discloses compositions comprising polymers such as polyamide or polyester, with a flame retardant comprising phosphinate or diphosphinate and melamine derivatives such as condensation products of melamine and/or reaction products of melamine with phosphoric acid and/or reaction products of condensation products of melamine with phosphoric acid and/or a mixture of these. Phosphinates or diphosphinates without melamine derivatives are shown to be ineffective for flame retarding glass-reinforced aliphatic polyamides.

Based on the foregoing discussion, an object of the present invention is to provide a flame resistant polyamide resin composition capable of yielding articles that possess excellent flame retardance and good physical properties and good electrical insulation properties even under conditions of high humidity. A further object of the present invention is to provide shaped structures and parts that meet UL-94 standards for flame retardancy for use in electrical and electronic parts that require good electrical insulation properties. A feature of the present flame resistant polyamide resin compositions is their good heat stability in molding and attendant excellent moldability. An advantage of the present compositions is their notable mechanical properties. These and other objects, features and advantages of the present invention will become better understood upon having reference to the following description of the invention.

SUMMARY OF THE INVENTION

The present invention, which allows the stated objective to be attained, concerns a flame resistant polyamide resin composition comprising:
(a) about 20 to about 90 weight percent of an aromatic polyamide that is derived from about 5 to about 75 mole percent of aromatic monomers,
(b) about 10 to about 40 weight percent of a flame retardant comprising a phosphinate of the formula (I) and and/or a disphosphinate of the formula (II) and/or polymers of these

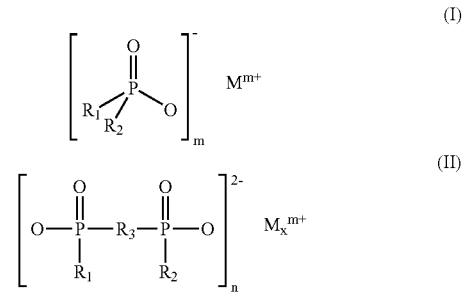

wherein $R_1$ and $R_2$ are identical or different and are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions and/or zinc ions, m is 2 to 3; n is 1 or 3; x is 1 or 2, and
(c) 0 to about 60 weight percent of inorganic reinforcing agent and/or filler,
(d) 0 to about 10 weight percent of at least one synergist, the above stated percentages being based on the total weight of the composition.

Further provided are articles made from the composition of the invention and more particularly such articles and compositions for use in electrical and electronic applications.

DETAILED DESCRIPTION OF THE INVENTION

Aromatic Polyamide

The aromatic polyamide used in the present invention may be one or more homopolymers, copolymers, terpolymers, or higher polymers that are derived from monomers containing aromatic groups. It may also be a blend of one or more homopolymers, copolymers, terpolymers, or higher polymers that are derived from monomers containing aromatic groups with one or more aliphatic polyamides.

Examples of monomers containing aromatic groups are terephthalic acid and its derivatives, isophthalic acid and its derivatives, and m-xylylenediamine. It is preferred that about 5 to about 75 mole percent of the monomers used to make the aromatic polyamide used in the present invention contain aromatic groups, and more preferred that about 10 to about 55 mole percent of the monomers contain aromatic groups. Thus, preferably, about 5 to about 75 mole percent, or more preferably, 10 to about 55 mole percent of the repeat units of all polyamides used in the present invention contain aromatic groups.

The aromatic polyamide may be derived from one or more of adipic acid, sebacic acid, azelaic acid, dodecandoic acid, terephthalic acid, isophthalic acid or their derivatives and other aliphatic and aromatic dicarboxylic acids and aliphatic $C_6$-$C_{20}$ alkylenediamines, aromatic diamines, and/or alicyclic diamines. Preferred diamines include hexamethylenediamine; 2-methylpentamethylenediamine; 1,9-diaminononane; 1,10-diaminodecane; 1,12-diaminododecane; and m-xylylenediamine. It may also be derived from lactams or aminoacids.

Preferred aromatic polyamides include poly(m-xylylene adipamide) (polyamide MXD,6); poly(docemethylene terephthalamide) (polyamide 12,T); poly(decaamethylene terephthalamide) (polyamide 10,T); poly(nonamethylene terephthalamide) (polyamide 9,T); the polyamide of hexamethylene terephthalamide and hexamethylene adipamide (polyamide 6,T/6,6); the polyamide of hexamethyleneterephthalamide and 2-methylpentamethyleneterephthalamide (polyamide 6,T/D,T); the polyamide of hexamethylene terephthalamide and hexamethylene isophthalamide (polyamide 6,T/6,I) and copolymers and mixtures of these polymers.

Examples of aliphatic polyamide homopolymers, copolymers, or terpolymers that may be blended with polyamides derived from monomers containing aromatic groups include polyamide 6, polyamide 66, polyamide 610, polyamide 612, polyamide 46, polyamide 66/6 copolymers, polyamide 66/68 copolymers, polyamide 66/610 copolymers, polyamide 66/612 copolymers, polyamide 66/10 copolymers, polyamide 66/12 copolymers, polyamide 6/68 copolymers, polyamide 6/610 copolymers, polyamide 6/612 copolymers, polyamide 6/10 copolymers, polyamide 6/12 copolymers, polyamide Jun. 66, 19610 terpolymers, polyamide Jun. 66, 1969 terpolymers, polyamide 6/66/11 terpolymers, polyamide 6/66/12 terpolymers, polyamide 6/610/11 terpolymers, polyamide 6/610/12 terpolymers, and polyamide 6/66/PACM [where PACM refers to bis-p-(aminocyclohexyl)methane)] terpolymers. The aromatic polyamide will comprise about 20 to about 90 weight percent of the total composition.

Flame Retardant

The flame retardants in the polyamide resin composition in this invention are flame retardant combinations (such as those disclosed in U.S. Pat. No. 6,255,371) comprising (a), a phosphinate of the formula (I) and/or a diphosphinate of the formula (II) and/or polymers of these,

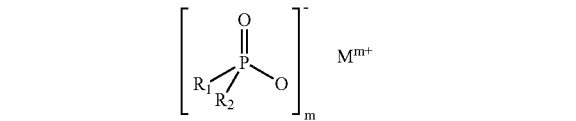

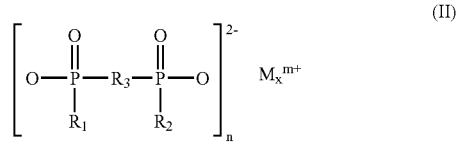

wherein $R_1$ and $R_2$ are identical or different and are $C_1$-$C_6$ alkyl, linear, or branched, and/or aryl; $R_3$ is $C_1$-$C_{10}$-alkylene, linear, or branched, $C_6$-$C_{10}$-arylene, -alkylarylene or -arylalkylene; M is calcium ions, magnesium ions, aluminum ions and/or zinc ions; m is 2 to 3; n is 1 or 3; and x is 1 or 2; and optionally comprising, condensation products of melamine and/or reaction products of melamine with phosphoric acid and/or reaction products of condensation products of melamine with phosphoric acid and/or comprising a mixture of these.

$R_1$ and $R_2$ may be identical or different and are preferably methyl, ethyl, n-propyl, isopropyl, n-butyl, tert-butyl, n-pentyl and/or phenyl. $R_3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum ions or zinc ions.

Preferred phosphinates are aluminum methylethylphosphinate, and, more preferably, aluminum diethylphosphinate.

The composition of the present invention contains about 10 to about 40 weight percent, or preferably about 10 to about 35 weight percent flame retardant, based on the total weight of the composition.

Other flame retardant synergists may also be optionally included in the composition in conventional amounts and as understood by those having skill in the field. Examples include silicone, metal oxides such as silica, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide, metal powder such as aluminum, iron, titanium, manganese, zinc, molybdenum, cobalt, bismuth, chromium, tin, antimony, nickel, copper and tungsten, and metal salts such as zinc borate, zinc metaborate, barium metaborate, zinc carbonate, magnesium carbonate, calcium carbonate, and barium carbonate. Preferred synergists are boehmite (aluminum hydroxide oxide (AlO(OH))), aluminum oxide, zinc borate, and mixtures thereof. Synergists will preferably be present in up to about 10 weight percent or more preferably in about 0.5 to about 8 weight percent, or yet more preferably in about 1 to about 6 weight percent, based on the total weight of the composition.

Inorganic Reinforcing Agent and/or Filler

The inorganic reinforcing agent and/or filler of the present invention are those customarily used in the reinforcement and filling of engineering polymers. Mixtures of two or more inorganic fillers and/or reinforcing agents may be used. Examples of inorganic reinforcing agents and/or fillers include one or more of glass fibers, glass flakes, kaolin, clay, talc, wollastonite, calcium carbonate, silica, carbon fibers, potassium titanate, etc. Glass fibers are preferred. The inorganic reinforcing agent and/or filler used in the present invention may be present in up to about 60 weight percent, or, preferably, in about 5 to about 50 weight percent, based on the total weight of the composition.

The polyamide resin compositions of the present invention may further contain other polymers, impact modifiers, organic fillers, heat stabilizers, plasticizers, antioxidants, nucleating agents, dyes, pigments, mold-release agents, lubricants, flame retardants, impact modifiers, and other additives in addition to the components mentioned previously. Examples of antioxidants include phenolic antioxidants, thioether antioxidants, and phosphite antioxidants.

The polyamide resin compositions of the present invention are melt-blended and can be manufactured by any known manufacturing methods. The component materials may be mixed to homogeneity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until homogeneous.

The articles of the present invention may be formed from the compositions of the invention by any known means such as injection molding, blow molding, extrusion, or thermoforming. Examples of articles that may be formed from the compositions of the present invention are housings, electrical connectors and connector housings and cases, breaker housings, and contactor housings.

The invention is illustrated by the following Examples.

EXAMPLES

Examples 1-6 and Comparative Examples 1-6

The components were dry blended and then compounded with a screw speed of 300 rpm using a ZSK-40 twin-screw extruder manufactured by W&P. The barrel temperatures were about 325° C. for Examples 1-6 and Comparative Examples 1 and 2 and about 285° C. for Comparative Examples 3-6. Upon exiting the extruder, the molten polymer was quenched in a water bath and pelletized.

The resultant resin compositions were used to mold 13 mm×130 mm×3.2 mm test pieces according to ASTM D638 or 3 mm ISO all-purpose bars. The following test procedures were used and the results are shown in Tables 1 and 2.

| | |
|---|---|
| Mold deposit: | The mold surface was visually checked after 30 0.8 mm thickness UL bars were molded in a Toshiba IS170F3 molding machine with a melt temperature of 290° C. and a mold temperature of 80° C. If mold deposit was seen on the surface of the mold, this is indicated in Tables 1 and 2. |
| Flex strain at break: | Measured using 3 mm ISO all-purpose bars (dry as molded) following ISO 178. |
| TS: | Tensile elongation at break of specimens measured dry-as-molded following ISO 527-1/2. |
| Elongation at break: | Measured using 3 mm ISO all-purpose bars (dry as molded) following ISO 527-1/-2. |
| Flexural modulus: | Measured using 3 mm ISO all-purpose bars (dry as molded) following ISO 178. |
| Notched Charpy: | Measured using 3 mm ISO all-purpose bars (dry as molded) following ISO 179/1eA. |
| Density: | Measured following ISO 1183. |
| Thermal tracking index (CTI): | Measured using 3 mm ISO all-purpose bars (dry as molded) following IEC 112. |

Flammability testing was done according to UL-94 (20 mm Vertical Burning Test) using $1/16^{th}$ inch or $1/32^{nd}$ inch thick test pieces, which are then conditioned for either 48 hours at 23° C. and 50% relative humidity or 168 hours at 70° C.

The components shown in Tables 1 and 2 were as follows:

| | |
|---|---|
| Polyamide 66: | Polyamide 66 (Zytel ® FE1111, available from E.I. du Pont de Neumours) |
| Polyamide 6: | Polyamide 6 (Ultramid B3, available from BASF) |
| Polyamide 6T/6I: | Polyamide 6T6I (Zytel ® 330, available from E.I. du Pont de Neumours) |
| Polyamide 6T/66: | HTN502 (available from E.I. du Pont de Neumours), Arlen C-2000 (available from Mitsui Chemical) or PXM 99 (available from Solvay). |
| Flame retardant 1: | Aluminum diethylphosphinate (Exolit OP1230 available from Clariant) |
| Flame retardant 1: | Aluminum diethylphosphinate (Exolit OP930 available from Clariant) |
| Flame retardant 3: | Dibromostyrene/glycidyl methacrylate copolymer (CN 2044C; available from Great Lakes Chemical Co.) |
| Glass fibers: | FT756X (available from Asahi Fiber Glass) (Examples 1) or FT756D (Examples 3-6) or PPG 3540 (available from PPG Industries, Inc.) (Example 2 and Comparative Examples 1-5) |
| Surlyn ® 8920: | A neutralized ethylene-methacrylic acid copolymer produced by E.I. DuPont de Nemours, Inc. |
| PED 521: | Licowax PED 521 (available from Clariant Corp) |
| Wax OP: | Lubricant (available from Clariant Corp) |
| Acrawax C: | Lubricant (available from Lonza) |
| Firebrake ® 500: | Zinc borate available from US Borax |
| Boehmite 1: | Celasule BMM (available from Kawai Sekkai Kogyo) |
| Boehmite 2: | Celasule BMT-33 (available from Kawai Sekkai Kogyo) |

TABLE 1

|  | Ex. 1 | Ex. 2 | Comp. Ex. 1 | Comp. Ex. 2 | Comp. Ex. 3 | Comp. Ex. 4 | Comp. Ex. 5 | Comp. Ex. 5 |
|---|---|---|---|---|---|---|---|---|
| Polyamide 66 | 38.7 | — | — | — | 54.9 | 49.9 | — | — |
| Polyamide 6 | — | — | — | — | — | — | 54.75 | 49.75 |
| Polyamide 6T/6I | 9.3 | — | — | — | — | — | — | — |
| Polyamide 6T/66 | — | 49.55 | 69.55 | 42.45 | — | — | — | — |
| Flame retardant 1 | 22 | — | — | — | 20 | 20 | 20 | 20 |
| Flame retardant 2 | — | 20 | — | — | — | — | — | — |
| Flame retardant 3 | — | — | — | 22.1 | — | — | — | — |
| Glass fibers | 30 | 30 | — | — | 25 | 30 | 25 | 30 |
| PED 521 | — | 0.2 | 0.2 | 0.2 | — | — | — | — |
| Wax OP | — | 0.25 | 0.25 | 0.25 | — | — | — | — |
| Aluminum distearate | — | — | — | — | 0.1 | 0.1 | — | — |
| Acrawax ® C | — | — | — | — | — | — | 0.25 | 0.25 |
| Surlyn ® 8920 | — | — | — | 1.00 | — | — | — | — |
| Firebrake ® 500 | — | — | — | 4 | — | — | — | — |
| Mold deposit | No | — | — | — | — | — | — | — |
| Flex strain at break (%) | 2.9 | — | — | — | — | — | — | — |
| TE (%) | 2.8 | — | — | — | — | — | — | — |
| Flammability testing |  |  |  |  |  |  |  |  |
| 1/32 inch; 23° C./50% relative humidity/48 hours | V-0 | V-1 | HB | V-0 | — | — | — | — |
| 1/32 inch; 70° C./168 hours | V-0 | V-1 | HB | V-0 | — | — | — | — |
| 1/16 inch; 23° C./50% relative humidity/48 hours | — | V-1 | HB | V-0 | HB | HB | HB | HB |
| 1/16 inch; 70° C./168 hours | — | V-0 | HB | V-0 | HB | HB | HB | HB |
| 1/8 inch; 23° C./50% relative humidity/48 hours | — | V-0 | HB | V-0 | HB | HB | HB | HB |
| 1/8 inch; 70° C./168 hours | — | V-0 | HB | V-0 | HB | HB | HB | HB |
| Tensile strength (MPa) | — | 166 | 195 | 184 | 165 | 170 | 137 | 155 |
| Elongation at break (%) | — | 2.8 | 2.6 | 2.1 | 3.3 | 2.9 | 3.2 | 3.3 |
| Flexural modulus (MPa) | — | 10918 | 9525 | 11451 | 8821 | 10140 | 8418 | 9790 |
| Unnotched Charpy (kJ/m$^2$) | — | 66 | 55 | 56 | — | — | 72 | 84 |
| Density (g/mL) | — | 1.45 | 1.40 | 1.62 | 1.37 | 1.42 | 1.36 | 1.41 |
| CTI (V) | — | 600 | 425 | 425 | — | — | — | — |

Ingredient amounts are given in weight percent relative to the total weight of the composition.

TABLE 2

|  | Ex. 3 | Ex. 4 | Ex. 5 | Ex. 6 |
|---|---|---|---|---|
| Polyamide 6T/66 | 50 | 50 | 50 | 50 |
| Flame retardant 1 | 18 | 18 | 18 | 18 |
| Glass fibers | 30 | 30 | 30 | 30 |
| Firebrake ® 500 | 2 | 1 | — | 1 |
| Boehmite 1 | — | — | 2 | 1 |
| Boehmite 2 | — | 1 | — | — |
| Flammability testing |  |  |  |  |
| 1/32 inch; 23° C./50% relative humidity/48 hours | V-0 | V-0 | V-0 | V-0 |
| 1/32 inch; 70° C./168 hours | V-0 | V-0 | V-0 | V-0 |

Ingredient amounts are given in weight percent relative to the total weight of the composition.

It can thus be seen that the polyamide resin composition of the present invention is a resin composition which possesses excellent flame retardance and good mechanical properties and a high thermal tracking index and low density. In addition, the compositions can be molded without generating significant mold deposit.

The invention claimed is:

1. A flame retardant polyamide resin composition, comprising:
   (a) about 20 to about 90 weight percent of an aromatic polyamide that is derived from about 5 to about 75 mole percent of aromatic monomers;
   (b) about 10 to about 40 weight percent of a flame retardant comprising one or more of a phosphinate of the formula (I), a disphosphinate of the formula (II), or polymers of these

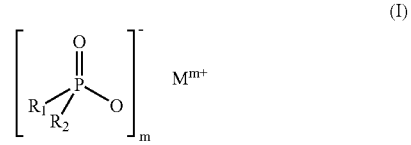

(I)

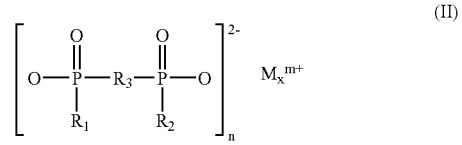

(II)

wherein $R_1$ and $R_2$ are identical or different or are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is one or more of calcium ions, magnesium ions, aluminum ions and zinc ions, m is 2 to 3; n is 1 or 3; x is 1 or 2; and (c) 0 to about 60 weight percent of inorganic reinforcing agent and/or filler;

(d) about 0.5 to about 8 weight percent of a synergist comprising boehmite, the above stated percentages being based on the total weight of the composition.

2. The flame retardant polyamide resin composition of claim 1, further comprising one or more antioxidants.

3. The flame retardant polyamide resin composition of claim 2, wherein the one ore more antioxidants are selected from one or more of phenolic antioxidants, thioether antioxidants, and phosphite antioxidants.

4. The flame retardant polyamide resin composition of claim 1, wherein the aromatic polyamide is at least one selected from polyamide 6, T/6,6; polyamide 6, T/D,T; polyamide 6, T/6,I; polyamide MXD,6; polyamide 12, T; polyamide 10, T; and polyamide 9, T.

5. The flame retardant polyamide resin composition of claim 1, wherein the inorganic reinforcing agent is glass fibers.

6. The flame retardant polyamide resin composition of claim 1 wherein the flame retardant (c) comprises one or both of aluminum diethylphosphinate or aluminum methylethylphosphinate.

7. A molded article comprising the flame resistant polyamide resin composition of any of claims 1-4, 5 or 6.

8. The molded article of claim 7, selected from the group consisting of connector housings, breaker housings, and contactor housings.

9. The molded article of claim 8 as an electrical connector.

* * * * *